United States Patent Office 3,055,857
Patented Sept. 25, 1962

3,055,857
COMPOSITION COMPRISING A COPOLYMER OF AN ISOOLEFIN AND A MULTIOLEFIN AND 2 - MERCAPTOIMIDAZOLINE AND BLENDS THEREOF WITH AN UNSATURATED RUBBER
Roger S. Hawley, Cranford, Robert E. Clayton, Roselle Park, and Donald J. Buckley, Plainfield, N.J., assignors to Esso Research and Engineering Company, a corporation of Delaware
No Drawing. Filed May 12, 1960, Ser. No. 28,537
17 Claims. (Cl. 260—41.5)

The present invention relates to improved halogenated butyl rubber compositions. More specifically, it deals with forming vulcanizates, particularly of white or pastel shades, having improved resistance to aging and discoloration as well as improving the adhesion of halogenated butyl to highly unsaturated rubbers.

In recent years a highly unique, low unsaturation type of rubbery copolymer, namely, halogenated butyl rubber, particularly chlorinated butyl, has been developed. Among the various uses suggested for halogenated butyl is employing it for tire sidewalls, particularly premium grade white sidewalls. The automotive industry in particular desires making light and pastel colored parts from chlorinated butyl rubber, e.g., weather stripping, which would be in harmony with the various painted parts of an automobile. It would also be desirable to make halogenated butyl articles of white and pastel shades for insulation, plug coverings, weather strips, and hose, gaskets, etc.

However, one of the difficulties encountered in employing halogenated butyl in such applications has been the tendency of such compositions to become sticky when exposed to natural weathering causing dirt readily to adhere to its surface. Naturally, such articles, particularly light colored or pastel compositions, readily acquire an unacceptable appearance. Washing the surface is of little help since the dirt soon returns to the tacky surface. This difficulty has been the prime reason why halogenated butyl has not yet been widely accepted for white tire sidewalls.

In accordance with the present invention, means are taught whereby the aging and weathering properties of halogenated butyl compositions can be greatly improved. The present invention prevents surface stickiness and gives a product having an exceptional ability not to discolor upon exposure to the atmosphere as well as maintaining halogenated butyl characteristics of resistance to cracking.

More specifically, it has surprisingly been found that by incorporating a specific concentration, namely, at least about 3 weight percent based on halogenated butyl rubber, of 2-mercaptoimidazoline in halogenated butyl compositions, a product of greatly improved resistance to discoloration is obtained. Particularly advantageous results are obtained in articles that do not have to be cleaned regularly and thoroughly. The 2-mercaptoimidazoline can be employed broadly in amounts ranging from 3 to 10, preferably 3 to 7, weight percent based on halogenated butyl rubber.

This is a completely unexpected result for several reasons. Although 2-mercaptoimidazoline, per se, is not new to the rubber art, heretofore it has been principally used as a vulcanization accelerator in treating relatively highly unsaturated rubber, as contrasted with low unsaturation halogenated butyl rubber. Moreover, it had been employed in curing rubbers in concentrations well below 3 weight percent. It had never been employed as an agent for improving resistance to discoloration. In contrast, it has now been found that the specific application of large concentrations of 2-mercaptoimidazoline, i.e., considerably above that necessary for mere vulcanization, in a specific low unsaturation rubber copolymer, namely halogenated butyl rubber, gives products of unusual resistance to discoloration upon weathering. As will be demonstrated hereafter, neither smaller concentrations of 2-mercaptoimidazoline nor equivalent concentrations of closely chemically related vulcanization accelerators such as thiocarbanilide yield products resistant to dirt pickup.

Further, an additional advantage is secured when bonding halogenated butyl rubbers to highly unsaturated rubbers, i.e., those having mole percent unsaturations of over 50. It has been found that the high concentrations of 2-mercaptoimidazoline give a covulcanizate of unusually high adhesion value. This is particularly so in systems where conventional curatives such as elemental sulfur, zinc oxide are not employed. Typical examples of such high unsaturation rubbers are natural rubber and butadiene-styrene copolymers, etc., and mixtures thereof. Such high adhesion is particularly desirable in adhesion of halogenated butyl white sidewalls or interliners to tires composed principally of the unsaturated rubbers noted.

For the sake of clarifying the nature of the low unsaturation rubbery copolymers to which the present invention is addressed, it is noted that copolymers of the above general class, particularly where the copolymers contain about 85 to 99.5 weight percent of a $C_4$ to $C_8$ isoolefin, e.g., isobutylene, with about 15 to 0.5 weight percent of a multiolefin of about 4 to 14 carbon atoms, e.g., myrcene, isoprene, butadiene, etc. are well known in the literature as "butyl rubber." For example, see "Synthetic Rubber," by G. S. Whitby, and U.S. Patent 2,356,128, among many others. Halogenated butyl rubber-type copolymers are produced by halogenating butyl rubber in a manner which does not substantially degrade its molecular weight but however gives a rubbery product of substantially different properties than the unhalogenated material. Butyl rubber may be halogenated at temperatures of −50° to 200° C., preferably 0° to 100° C., at pressures of 0.5 to 900 p.s.i.a. with suitable halogenating agents such as gaseous chlorine, liquid bromine, iodine monochloride, sulfenyl halide, etc. Halogenation may be accomplished in various ways. For example, the halogenation agent, e.g., chlorine, may be added to a solution of the copolymer in a suitable inert liquid organic solvent. The resulting halogenated polymer may be recovered by precipitation with a non-solvent at about 0 to 180° C., spray drying, or by flashing off the hydrocarbon solvent by injection into a hot water bath.

Preferably, the degree of halogenation is carefully regulated so that the halogenated copolymer contains at least 0.3 weight percent of combined halogen but not more than about one atom of combined fluorine or chlorine per double bond in the polymer, nor more than three atoms of combined bromine or iodine per double bond. A more detailed description of the formation of chlorinated butyl rubber may be had by referring to co-assigned Serial No. 512,182, filed May 31, 1955, now Patent No. 2,944,578.

The halogenated copolymer has a viscosity average molecular weight of about 100,000 to 2,000,000, and a mole percent unsaturation of between 0.1 to 20, preferably less than 10. As hereinafter employed in the specification, the term "halogenated butyl rubber" denotes the above-described halogenated copolymers of a major portion of a $C_4$ to $C_8$ isoolefin and a minor portion of a $C_4$ to $C_{14}$ multiolefin.

The compositions of the present invention containing halogenated butyl and high concentrations of 2-mercaptoimidazoline may also contain various compounding agents. While when covulcanizing halogenated butyl and high unsaturation rubbers, the presence of other curing agents with the exception of zinc oxide and/or magnesium oxide is neither necessary nor desirable, various curing agents, accelerators, etc. may be used in conjunction with 2-mercaptoimidazoline in curing the halogenated butyl, e.g., sulfur, zinc oxide, tetramethyl thiuram disulfide, etc. Conventional ingredients (per 100 parts of halogenated butyl) such as 0 to 5 parts of a mold release agent, e.g., stearic acid, 0 to 5 parts of a conventional bluing agent, e.g., Prussian blue, ultramarine blue may be used.

The compositions may be cured at 200 to 400° F., preferably 250° to 350° F. by any of the conventional techniques, e.g., steam curing, press-curing, etc.

The halogenated butyl compositions preferably contain 10 to 50 parts by weight of metallic oxides such as titanium dioxide, magnesium oxide, zinc oxide, and calcium oxide; and fillers such as silica, talc and clay. Pigments suitable for pastel compositions when employed in minor quantities but generally less satisfactory for white butyl compositions are as follows: lead oxides, lead carbonates, lead sulphates, cadmium lead, calcium carbonate, ferric hydroxide, and chrome yellow lead chromate.

Since the present compositions find particular use in pastel or white colored articles, the compositions of the present invention will be normally free of carbons.

The various aspects and modification of the present invention will be made more clearly apparent by reference to the following description and accompanying examples.

A typical halogenated butyl rubber, hereinafter termed "halogenated butyl A" was prepared by halogenating a butyl rubber with chlorine at a temperature of about 25° C. The resulting halogenated copolymer was composed of about 97 weight percent isobutylene, 1.8 weight percent isoprene and contained 1.2 weight percent combined chlorine. It had a viscosity average molecular weight of about 400,000, a mole percent unsaturation of about 1.8 and a Mooney viscosity of 54 (8 minutes at 212° F.).

EXAMPLE 1

In each of several runs, halogenated butyl A containing varying quantities of 2-mercaptoimidazoline was compounded with the same quantities of conventional compounding ingredients in the following proportions and then cured at 307° F. for 25 minutes. The vulcanizates were white in color due to the presence of titanium dioxide and absence of carbon.

Parts by weight
Halogenated butyl A _____ 100
Talc (Mistron vapor) _____ 105
$TiO_2$ (Titanox) _____ 40
Stearic acid _____ 1
Ultramarine blue _____ 0.2
Zinc oxide _____ 5

The vulcanizates had the following properties:

Table I

| Sample No. | 1 | 2 | 3 | 4 | 5 |
|---|---|---|---|---|---|
| 2-mercaptoimidazoline, p.p.r. (parts per hundred of rubber) | 0.5 | 1 | 3 | 5 | 7 |
| Tensile strength, p.s.i. | 1,145 | 1,205 | 1,275 | 1,225 | 1,270 |
| Elongation, percent | 615 | 650 | 665 | 640 | 645 |
| 300% modulus, p.s.i. | 650 | 600 | 590 | 450 | 500 |
| Shore "A" hardness | 65 | 63 | 60 | 61 | 62 |

As can be seen from Table I, while the vulcanizates had good properties, little difference in tensile, elongation or modulus is obtained by employing high concentrations of mercaptoimidazoline since as little as 0.5 weight percent mercaptoimidazoline is suitable for curing halogenated butyl. Thus, the data suggests no reason for employing higher concentrations of mercaptoimidazoline.

EXAMPLE 2

The vulcanizates of Example 1 were then mounted on racks for outdoor exposure at 20% elongation, facing south at a 45° angle. The exposure tests were made during the months of July to December. The samples were not cleaned nor in any manner disturbed.

After about one month of exposure, samples numbered 1 and 2 (0.5 and 1.0 p.h.r. of 2-mercaptoimidazoline) were off white or light gray due to the collection of a film of dirt on the surface.

In contrast, samples numbered 3, 4 and 5 (3, 5 and 7 p.h.r. respectively of 2-mercaptoimidazoline) were lighter in color and more nearly white. After two months of exposure, samples 3, 4 and 5 were vastly superior in appearance to samples 1 and 2. Samples 4 and 5 were nearly white and were cleaner than sample 3 which showed some discoloration. In contrast, samples 1 and 2 which contained less than about 3 weight percent mercaptoimidazoline were covered with a film of dirt that made the samples gray. Further exposures of up to three and a half months showed little difference between compounds 4 and 5.

The above results demonstrate the outstanding resistance of halogenated butyl, particularly chlorinated butyl, compositions to discoloration upon weathering when compounded with at least 3 weight percent based on halogenated butyl rubber of 2-marcaptoimidazoline. A preferred value of about 4 to 6 weight percent is indicated.

EXAMPLE 3

As controls for the runs described in Example 2, control samples (cured at 307° F. for 25 minutes) having the following compositions were given the same weathering test for the same test period as in Example 2. All compositions are in parts by weight:

Table II

| Sample No. | 6 | 7 |
|---|---|---|
| Halogenated butyl A | 100 | 100 |
| Talc (Mistron vapor) | 105 | 105 |
| Titanium dioxide (Titanox) | 40 | 40 |
| Stearic acid | 1 | 1 |
| Zinc oxide | 5 | 5 |
| Sulfur | 0 | 2.3 |
| Tetramethyl thiuram disulfide | 0 | 0.45 |
| 2,2'-benzothiazyl disulfide | 0 | 1.2 |
| Thiocarbanilide | 3 | 0 |

After being subjected to exposure for less than 2 months, sample No. 6 and sample No. 7 appeared gray and much inferior to samples 3, 4 and 5 in whiteness.

When sample No. 6 is compared with the results of Example 2, e.g., sample No. 3, it is seen that vulcanization accelerators (thiocarbanilide) closely related to mercaptoimidazoline in chemical structure fail to improve resistance to discoloration of halogenated butyl though employed in high concentrations. Sample No. 7 heretofore considered a particularly good formulation and one cured by conventional curatives in the absence of 2-mercaptoimidazoline had substantially poorer resistance to weathering than the present compositions.

EXAMPLE 4

In a similar series of tests to those described above, a halogenated butyl-2-mercaptoimidazoline formulation having the same composition as sample No. 3 of Example 1 and cured in the same manner, was compared with several white commercial vulcanizates indicated below. All samples were put on racks facing south at 45° C. and tested in flat fashion at 20% extension and looped in looped fashion in accordance with ASTM design D518–44A and B.

Commercial vulcanizates:
- (A) R. T. Vanderbilt's natural rubber compound (the Vanderbilt News, vol. 22, No. 4 (October 1956), page 46).
- (B) R. T. Vanderbilt's natural rubber—Neoprene GN (50/50 blend) compounds (same reference as A).
- (C) Du Pont's natural rubber—Hypalon (50/50 blend) compounds (Du Pont report No. 56–4 (September 1956), page 48).
- (D) Du Pont's natural rubber—Hypalon-Neoprene W (40/20/40 blend) compounds (same reference as C).

After 400 days of exposure, the composition of the present invention was white and had no cracks or surface roughness. All the controls, i.e., (A), (B), (C) and (D), appeared dirty and had varying degrees of roughness.

The greatly improved resistance to discoloration due to weathering and cracking offered by the compositions of the present invention is, therefore, emphasized.

EXAMPLE 5

In order to demonstrate the further advantage of the present invention, namely their high adhesion to unsaturated rubbers, the following experimental tests are described.

Halogenated butyl rubber A was compounded in the manner indicated in Table III. Each of the compounds was then covulcanized with a commercial natural rubber, butadiene-styrene tire carcass compound for 19 and 29 minutes at 307° F. The carcass compound was composed of:

| | Parts by weight |
|---|---|
| Smoked sheet | 50 |
| SBR 1000 | 50 |
| Reogen [1] | 2 |
| Stearic acid | 2 |
| Zinc oxide | 3 |
| Heptylated diphenyl amine (Age Rite Stalite) | 1.5 |
| Necton 60 [2] | 3 |
| FEF black | 10 |
| SRF black | 40 |
| Sulfur | 2.5 |
| Benzothiazyl disulfide | 1.25 |
| Tetramethyl thiuram disulfide | 0.20 |

[1] Mixture of oil soluble sulfonic acid and paraffin oil sold by R. T. Vanderbilt Co.
[2] Plasticizer oil boiling in the range of about 750 to 950° F., specific gravity 0.89 and containing 23% aromatics.

The carcass compound and each of the halogenated butyl compounds indicated below are put in a sandwich in an unvulcanized state and then cured. The adhesion of each of the halogenated butyl-unsaturated rubber co-vulcanizates was then tested in duplicate tests denoted A and B in accordance with ASTM procedure D–413–39 (Machine Method). Results are summarized in Table III:

Table III

| | Parts by weight | | |
|---|---|---|---|
| Compound No. | 1 | 2 | 3 |
| Halogenated butyl A | 100 | 100 | 100 |
| MgO (Maglite K) | 2.0 | 2.0 | |
| TiO$_2$ (Titanox ALO) | 40 | 40 | |
| Talc (Mistron Vapor) | 105 | 105 | 40 |
| Stearic acid | 1.0 | 1.0 | 105 |
| ZnO | | 5.0 | 1.0 |
| 2-mercaptoimidazoline | 4.0 | 4.0 | 5.0 |
| Sulfur | | | 2.30 |
| Tetramethyl thiuram disulfide (methyl Tuads) | | | 0.40 |
| Benzothiazyl disulfide (Altax) | | | 1.25 |
| Ultramarine blue | 0.20 | 0.20 | 0.20 |
| Adhesion at 212° F. to high unsaturation rubber, lbs./in. at 2″/min. pull: | | | |
| 19 minute cures at 307° F.: | | | |
| Sandwich A | [1] 13 | [2] 4.5 | [2] 4.0 |
| Sandwich B | [1] 12 | [2] 4.0 | [2] 4.1 |
| 29 minute cures at 307° F.: | | | |
| Sandwich A | [1] 23 | [2] 3.0 | [2] 5.9 |
| Sandwich B | [1] 23 | [2] 3.0 | [2] 5.5 |
| Halogenated butyl vulcanizate properties: | | | |
| Cure, 15′/307° F.: | | | |
| Elongation, percent | 395 | 615 | 680 |
| 300N modulus, p.s.i. | 875 | 560 | 725 |
| Shore "A" hardness | 60 | 68 | 70 |
| Cure, 25′/307° F.: | | | |
| Elongation, percent | 460 | 610 | 695 |
| 300% modulus, p.s.i. | 1,025 | 675 | 725 |
| Shore "A" hardness | 68 | 73 | 72 |

[1] Failure in white vulcanizate.
[2] Failure at interface in white vulcanizate.

As seen from Table III, the composition of the present invention (compound 1) gave considerably stronger adhesion to highly unsaturated rubber than halogenated butyl cured with a conventional sulfur system (compound 3). Further, the desirability of employing a zinc oxide free compound where strong adhesion is desired is indicated by comparison of compounds 1 and 2. The higher modulus and lower elongation of halogenated butyl rubber compound number 1 further indicates the desirability of employing zinc oxide-free, mercaptoimidazoline-containing compositions where adhesion to high unsaturation rubber is important.

In summary, the compositions of the present invention have greatly improved resistance to weathering and discoloration. They may be readily bonded to high unsaturation rubbers and form bonds of greatly increased adhesive strength therewith.

Numerous modification will suggest themselves to one skilled in the art. For example, the substitution of other fillers for those used, variation of the total filler loading and variation of the ratios of the fillers are within the scope of the present invention.

Having described the invention, that which is sought to be protected is set forth in the following claims.

What is claimed is:

1. A composition of improved aging properties which comprises a halogenated rubbery copolymer of 85 to 99.5 weight percent of a $C_4$ to $C_8$ isoolefin and 0.5 to 15.0 weight percent of a $C_4$ to $C_{14}$ multiolefin, and 3 to 10 weight percent based on copolymer of 2-mercaptoimidazoline.

2. The composition of claim 1 wherein said copolymer contains at least 0.3 weight percent chlorine but no more than 1 atom of chlorine per double bond in the copolymer.

3. The composition of claim 1 which contains 3 to 7 weight percent based on rubber of 2-mercaptoimidazoline.

4. The composition of claim 1 which additionally contains an unsaturated rubber having a mole percent unsaturation of over 50.

5. A light colored vulcanizate comprising a halogenated rubbery copolymer of 85 to 99.5 weight percent of a $C_4$ to $C_8$ isoolefin and 0.5 to 15.0 weight percent of a $C_4$ to $C_{14}$ multiolefin, and 3 to 10 weight percent based on copolymer of 2-mercaptoimidazoline.

6. A vulcanizate according to claim 4 which additionally contains a member selected from the group consisting of magnesium oxide, zinc oxide, and titanium dioxide.

7. A composition of improved aging characteristics which comprises a chlorinated copolymer of 85 to 99.5 weight percent of a $C_4$ to $C_8$ isoolefin and 0.5 to 15 weight percent of a $C_4$ to $C_{14}$ multiolefin, and 3 to 10 weight percent based on copolymer of 2-mercaptoimidazoline.

8. A composition according to claim 7 wherein said polymer contains at least 0.3 weight percent combined chlorine but no more than 1 atom of chlorine per double bond in the copolymer.

9. A composition according to claim 7 wherein 3 to 7 weight percent of 2-mercaptoimidazoline based on copolymer is employed.

10. A composition according to claim 7 which additionally contains a member selected from the group consisting of magnesium oxide, zinc oxide, and titanium dioxide.

11. An improved composition which comprises a chlorinated copolymer of 85 to 99.5 weight percent of a $C_4$ to $C_8$ isoolefin and 0.5 to 15 weight percent of a $C_4$ to $C_{14}$ multiolefin, 3 to 10 weight percent based on copolymer of 2-mercaptoimidazoline, and an unsaturated rubber selected from the group consisting of natural rubber and butadiene-styrene polymers.

12. A tire having a light colored white tire sidewall, said tire having the composition of claim 11.

13. A process for improving the aging properties of a halogenated copolymer of 85 to 99.5 weight percent of a $C_4$ to $C_8$ isoolefin and 0.5 to 15.0 weight percent of a $C_4$ to $C_{14}$ multiolefin which comprises, admixing said copolymer with 3 to 10 weight percent of 2-mercaptoimidazoline and curing the admixture at a temperature of 200 to 400° F.

14. A process according to claim 13 where said admixture is added elemental sulfur free.

15. A process according to claim 13 wherein said copolymer is a chlorinated copolymer and is admixed with 3 to 7 weight percent of 2-mercaptoimidazoline.

16. A process for improving the adhesion of a chlorinated copolymer of 85 to 99.5 weight percent of a $C_4$ to $C_8$ isoolefin and 0.5 to 15.0 weight percent of a $C_4$ to $C_{14}$ multiolefin to an unsaturated rubber having a mole percent unsaturation above 50 which comprises covulcanizing said copolymer and unsaturated rubber in the presence of 3 to 10 weight percent based on copolymer of 2-mercaptoimidazoline.

17. The process of claim 16 where said 2-mercaptoimidazoline is the primary curative employed for covulcanization and said copolymer is free of admixed zinc oxide.

References Cited in the file of this patent

UNITED STATES PATENTS

| | | |
|---|---|---|
| 2,559,333 | Abell | July 3, 1951 |
| 2,692,250 | Walter | Oct. 19, 1954 |
| 2,751,370 | Roussel | June 19, 1956 |
| 2,889,307 | Clayton | June 2, 1959 |
| 2,962,474 | Fusco et al. | Nov. 29, 1960 |